3,349,094
PYRIDINIUM SALTS
Norman Gunning Bromby, Graham Howard Rayner, and David Buchanan Wootton, Manchester, England, assignors to Imperial Chemical Industries Limited, London, England, a corporation of Great Britain
No Drawing. Filed Apr. 27, 1964, Ser. No. 362,965
Claims priority, application Great Britain, May 7, 1963, 17,986/63
8 Claims. (Cl. 260—297)

This invention relates to new pyridinium salts of particular value as scorch retarding agents during the processing of rubber.

During the compounding operations to which a rubber stock containing a vulcanising agent and accelerator may be subjected before vulcanisation is carried out, some degree of premature vulcanisation, known as "scorching" may take place. This tendency to scorch is particularly great if the stock contains certain carbon blacks, especially furnace carbon blacks.

The danger of scorching can be reduced by incorporation into the rubber stock of certain nitrosoamines, but retarders of this type are liable to produce porous vulcanisates under certain circumstances and further may lead to discolouration of the vulcanised rubber and materials with which these come in contact. They also may have an adverse effect on rate of cure. Other retarders which are free of staining and porosity defects are exemplified by acidic substances such as salicylic acid and phthalic anhydride. However these acidic substances are less effective than the nitrosoamine type and also have an adverse effect on the rate of cure.

It has now been found that vulcanisable rubber compositions can be processed with a high margin of safety against scorching and then vulcanised if there is incorporated into the composition certain new aralkylpyridinium salts in which the aryl group contains a hydroxyl group. These salts are very effective retarders of premature vulcanisation, do not lead to stained or porous vulcanisates, and, when used in the appropriate amounts, have less effect on the rate of cure than other retarders.

According to the invention therefore there are provided new pyridinium salts of which the cation has the formula:

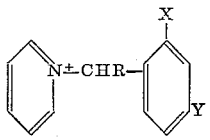

wherein R stands for a hydrogen atom or a lower alkyl group, one of the groups X and Y stand for a hydroxyl group and the other for a hydrogen atom or hydrocarbon group, and in which the pyridine and benzene rings may optionally carry additional substitutents.

As lower alkyl groups which may be represented by R there may be mentioned, for example, methyl, ethyl, or n-propyl groups.

As hydrocarbon groups which may be represented by X or Y there may be mentioned, for example, alkyl groups which may be straight chain or branched such as methyl, ethyl, n-propyl, isopropyl, butyl, amyl, hexyl, heptyl, octyl, nonyl, decyl or dodecyl, cycloalkyl groups such as cyclopentyl or cyclohexyl, substituted cycloalkyl groups such as α-methylcycloalkyl, aralkyl groups such as benzyl or aryl groups such as phenyl, and alkenyl groups such as vinyl or allyl.

As additional substitutents which may be carried by the pyridine and benzene rings there may be mentioned for example the hydrocarbon groups which may be represented by X or Y and saturated or unsaturated ring systems which may be fused with the pyridine and benzene rings. As examples of cations containing the latter type of substitutents there may be mentioned quinolinium and isoquinolinium salts, and salts in which the benzene ring is fused with another benzene ring as in naphthalene or with a cyclopentane ring as in indane. Both forms of substitution may be present together for example as in pyridinium salts derived from 4-hydroxyindanes carrying a hydrocarbon substitutent in the 5 or 7 position or 5-hydroxyindanes carrying a hydrocarbon substitutent in the 6 position. Particularly valuable pyridinium salts are those which the benzene ring carries two of the said hydrocarbon substituent groups at least one of which is situated in either the ortho or para positions relative to the hydroxyl group.

Another class of additional substituent which may be present in the benzene ring, particularly in a position ortho or para with respect to the hydroxyl group, is the group

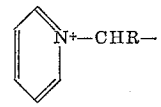

wherein R has the significance given earlier.

As anions which with the cation make up the pyridinium salt there may be mentioned for example halide, such as fluoride, bromide and iodide and especially chloride, nitrate, sulphate, phosphate, alkylsulphate such as methosulphate, alkanesulphonate, substituted alkanesulphonate, arylsulphonate such as p-toluenesulphonate, aralkylsulphonate, sulphamate, arylcarboxylate such as benzoate and salicylate, alkylcarboxylate such as acetate, oxalate, formate, thiocarbamate, thiosulphate and polythionates.

The pyridinium salts of the invention may be prepared in general by conventional methods hitherto used for the manufacture of pyridinium salts. For example the pyridinium halides may be obtained by interaction of the haloalkyl derivative of a phenol with the appropriate pyridine. Similarly the other pyridinium salts are afforded by pyridine and the appropriate aralkyl ester. The preparation of these salts may be carried out if desired in a solvent such as a hydrocarbon, chlorinated hydrocarbon, alcohol, ether or other solvent conventionally used in the preparation of pyridinium salts, in the presence or absence of water which in some cases has a catalytic effect. Temperatures from 0° to 100° C. are preferred for quaternary salt formation but higher or lower temperatures may be used if desired.

It is more convenient in some cases when the anion is not a halogen ion to prepare the salts from the pyridinium halide, particularly chloride, by interaction with an inorganic salt of the desired anion in an aqueous medium. This procedure is of value when the desired salt is not significantly soluble in water. Salts which may readily be prepared by this procedure include for example nitrates, thiosulphates, dithionates and tetrathionates.

In some cases this procedure may be combined with the procedure into one stage; for example a chloroalkyl phenol, potassium bromide and pyridine affords the pyridinium bromide.

The use of sulphites such as sodium sulphite, in this reaction leads however to pyridinium salts in which the anion is believed to be a sulphonate derived from the sulphonic acid obtained by replacement of the halogen in the original haloalkyl phenol by a sulphonic acid group. These quaternary sulphonates are included within the scope of the invention.

According to a further feature of the invention there is provided an improved process for the vulcanisation of rubber by heating with sulphur or a sulphur-bearing substance, a vulcanisation accelerator, and a retarder, characterised in that the retarder is a new pyridinium salt of which the cation has the formula:

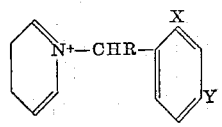

wherein R, X and Y have the significances given earlier and in which the pyridine and benzene rings may optionally carry additional substituents as hereinbefore described.

As rubbers which may be vulcanised by the process of the invention there may be mentioned natural rubber and synthetic rubbers such as polymers, which may be stereospecific polymers such as cis-polymers, of butadiene, 2-methylbutadiene, 2-chlorobutadiene, and isobutene, and copolymers of these compounds with each other and with acrylonitrile, styrene, methyl methacrylate, and other well-known polymerisable compounds which may be used for the manufacture of these rubbers, and mixtures of these polymers.

The sulphur or sulphur-bearing substance should preferably be used in the amounts conventional in vulcanisation, that is from 0.5 to 5.0% of the weight of rubber in the case of sulphur and from 1.0 to 5.0% in the case of a sulphur-bearing substance. As sulphur-bearing substances there may be mentioned for example amine polysulphides.

As accelerators for use in the process of the invention there may be mentioned for example thiazoles such as mercaptobenzthiazole, mercaptobenzthiazyl disulphide and the zinc salt of mercaptobenzthiazole, amine/aldehyde condensates such as butyraldehyde/aniline, ethylchloride/formaldehyde/ammonia, and p-toluidine/formaldehyde condensates, and especially guanidines such as diphenylguanidine and di-o-tolyguanidine and sulphenamides such as benzthiazylsulphencyclohexylamide, benzthiazylsulphen-tert.-octylamide, benzthiazylsulphen-tert.-butylamide, benzthiazylsulphenmorphide, benzthiazylsulphendicyclohexylamide, benzthiazylsulphenisopropylamide, benzthaizylsulphendiisopropylamide, benzthiazylsulphindimethylamide and dimethylthiocarbamyl-tert.-octylsulphenamide, and mixtures of these accelerators. There may also be used mixtures of one or more of these accelerators with minor amounts of other accelerators such as tetramethylthiuramidisulphide, tetraethylthiuramidisulphide, tetramethylthiuram monosulphide, or di-N:N'-cyclopentamethylenethiuram disulphide, or salts of dialkyl or alkylaryl dithiocarbamic acids with metals such as zinc, copper, bismuth, lead, nickel, sodium, or tellurium or with organic bases such as diethylamine. The amount of accelerator is preferably from 0.1% to 5% of the weight of rubber.

The amount of pyridinium salt should preferably be from 0.1 to 5.0% and more particularly from 0.25 to 1.0% of the weight of rubber. The salt may be anhydrous or may contain water or other solvents of crystallisation.

The pyridinium salt may be incorporated into the rubber by any conventional manner, for example on a two-roll mill or in an internal mixer, and is preferably added before or at the same time as the other ingredients but may be added after these.

The vulcanisation of the rubber may be carried out by heating at the temperature conventionally used for this operation, and preferably at a temperature between 120 and 160° C. although higher or lower temperatures may be used if desired.

The rubber may also contain other known adjuvants for the manufacture of rubber compositions, for example fillers, reinforcing agents, antioxidants, antiozonants, waxes, blowing agents, pigments, zinc oxide, fatty acids, processing oils, or other retarders such as salicyclic acid, phthalic anhydride or N-nitroso secondary amines.

The process of the invention is of particular value when the rubber also contains carbon blacks, particularly furnace carbon blacks, since these rubber mixes are especially prone to scorch.

The invention is illustrated but not limited by the following examples in which all parts and percentages are by weight unless otherwise stated.

*Example 1*

105.5 parts of paraform and 861 parts of 36% aqueous hydrochloric acid are stirred together at 0° C. and hydrogen chloride gas is passed through the mixture until substantially no more gas is absorbed. 367 parts of 4-methyl-2-α-methylcyclohexylphenol dissolved in 300 parts of benzene are added to the stirred mixture at about 0° C. during about 4 hours. During this addition a stream of hydrogen chloride is passed through the mixture. The mixture is allowed to warm slowly to room temperature, and the benzene layer is separated and washed with cold water. The benzene, together with a small amount of residual water and hydrogen chloride is removed by warming at about 50° C. under reduced pressure. 410 parts of crude 2 - chloromethyl - 4-methyl-6α-methylcyclohexylphenol are obtained as a yellowish-green viscous liquid.

25.25 parts of crude 2-chloromethyl-4-methyl-6-α-methylcyclohexylphenol are dissolved in 60 parts of petroleum ether and to the solution so obtained is added a solution of 8 parts of pyridine in 20 parts of petroleum ether. A precipitate of 22 parts of 2-hydroxy-5-methyl-3-(α-methylcyclohexyl)benzylpyridinium chloride is formed quickly. After recrystallisation from a mixture of petrol and ethyl alcohol this salt melts from 211.5° C. to 215° C.

*Example 2*

656 parts of 2-methyl-6-tert.-butylphenol dissolved in 700 parts of benzene are reacted with a mixture of 234 parts of paraform and 1624 parts of 36% aqueous hydrochloric acid by the procedure described in Example 1. The separated benzene solution of the resulting 4-chloromethyl-2-methyl-6-tert.-butylphenol is well washed with water and the washed benzene solution warmed under reduced pressure until the residual water is removed. To this dried benzene solution is added 340 parts of pyridine. A gummy precipitate is formed which later crystallises. 439 parts of 4-hydroxy-3-methyl-5-tert.-butylbenzylpyridinium chloride are obtained melting between 225° C. and 226° C.

*Example 3*

Using procedures similar to procedures described in Examples 1 and 2 the following chloromethylalkylphenols are prepared:

2-chloromethyl-4-methyl-6-tert.-butylphenol,
2-chloromethyl-4:6-ditert.-butylphenol,
4-chloromethyl-2:6-ditert.-butylphenol,
4-chloromethyl-2:6-diisopropylphenol,
2-chloromethyl-4-methyl-6-tert.-octylphenol.

These chloromethylalkylphenols are converted to their pyridinium quaternary chlorides by the procedures described in Examples 1 and 2.

2 - hydroxy-3-tert.-butyl-5-methylbenzylpyridinium chloride, melting between 214 and 215° C.

2 - hydroxy - 3:5-di-tert.-butylbenzylpyridinium chloride, melting between 201° C. and 202° C.

4 - hydroxy - 3:5-di-tert.-butylbenzylpyridinium chloride, melting at 226° C.

4 - hydroxy - 3:5-diisopropylbenzylpyridinium chloride, melting at 219° C.

2 - hydroxy - 3-tert.-octyl-5-methylbenzylpyridinium chloride, melting between 193° C. and 196° C.

4 - hydroxy - 3-tert.-butyl-5-methylbenzylpyridinium chloride, melting at 218° C.

Example 4

To a solution of 49.7 parts of 2-hydroxy 5-methyl-3 (α-methylcyclohexyl)benzyl pyridinium chloride in 175 parts of water is added a solution of 189 parts of hydrated sodium sulphite in 567 parts of water. The resulting red gummy precipitate is separated, washed with water and treated with ether to give 32.8 parts of 2-hydroxy-5-methyl-3(α-methylcyclohexyl)benzyl pyridinium 2-hydroxy-5-methyl-3(α-methylcyclohexyl) phenylmethanesulphonate, melting between 158° C. and 159° C.

Similarly 4 - hydroxy - 3 - methyl-5-tert.-butylbenzylpyridinium 4-hydroxy-3-methyl-5-tert.-butylphenylmethane sulphonate, melting between 202.5° C. and 203.5° C. is prepared from 4-hydroxy-3-methyl-5-tert.-butylbenzylpyridinium chloride and sodium sulphite.

Example 5

6.6 parts of 2-hydroxy-5-methyl-3-(α-methylcyclohexyl) benzylpyridinium chloride and 3.4 parts of sodium nitrate, each dissolved in 25 parts of water, are mixed. After standing to complete the reaction 6.6 parts of 2-hydroxy - 5 - methyl - 3-(α-methylcyclohexyl)benzylpyridinium nitrate, melting between 133° C. and 134° C. are filtered off. Recrystallisation from acetone raises the melting point to between 135° C. and 136° C.

Example 6

66.2 parts of 2-hydroxy-5-methyl-(α-methylcyclohexyl) benzylpyridinium chloride in 150 parts of water are mixed with 50 parts of sodium thiosulphate crystals in 150 parts of water. After 1 hour the precipitate is filtered off, washed with acetone and dried. 64 parts of bis[2 - hydroxy-5-methyl-3-α-methylcyclohexylbenzylpyridinium]thiosulphate, melting from 74° C. to 75° C. are obtained.

By using sodium dithionate or sodium tetrathionate in place of sodium thiosulphate are obtained Bis[2-hydroxy-5-methyl-3-α-methylcyclohexylbenzyl-pyridinuim]dithionate, melting with decomposition between 206° C. and 207° C., and Bis[2-hydroxy-5-methyl-3-α-methylcyclohexylbenzyl-pyridinium] tetrathionate, melting between 151° C. and 152° C.

Example 7

The following rubber compounds are prepared in the conventional manner on an open roll mill:

| | Parts |
|---|---|
| Smoked sheet natural rubber | 100 |
| Zinc oxide | 3.5 |
| Stearic acid | 3.0 |
| High abrasion furnace black | 45 |
| Process oil | 3.5 |
| Sulphur | 2.5 |
| N-cyclohexylbenzthiazyl-sulphenamide | 0.5 |
| Additive | 0 or 0.5 |

Portions of these compounded rubbers are tested for Mooney scorch at 120° C. according to BS 1673, part 3 (1951).

| Additive: | Mooney scorch at 120° C. time to (minimum +10), minutes |
|---|---|
| None | 22 |
| N-nitrosodiphenylamine | 27 |
| 2-hydroxy-5-methyl-3(α-methylcyclohexyl)benzylpyridinium chloride | 28 |
| 2-hydroxy-5-methyl-3(α-methylcyclohexyl) benzylpyridinium 2-hydroxy-5-methyl-3(α-methylcyclohexyl)phenylmethane sulphonate | 29 |
| 2-hydroxy-5-methyl-3(α-methylcyclohexyl) benzylpyridinium nitrate | 29½ |
| Bis[2-hydroxy-5-methyl-3(α-methylcyclohexyl) benzylpyridinium]thiosulphate | 27 |
| 4-hydroxy-3-methyl-5-tert.-butylbenzyl-pyridinium 4-hydroxy-3-methyl-5-tert.-butylphenylmethane sulphonate | 30 |
| Bis[2-hydroxy-5-methyl-3(α-methylcyclohexyl) benzylpyridinium]dithionate | 26 |
| Bis[2-hydroxy-5-methyl-3(α-methylcyclohexyl) benzylpyridinium]tetrathionate | 26 |
| 3:5-ditert.-butyl-2-hydroxybenzylpyridinium chloride | 27 |
| 4-hydroxy-3-tert.-butyl-5-methylbenzyl-pyridinium chloride | 28 |
| 2-hydroxy-3-tert.-butyl-5-methylbenzyl-pyridinium chloride | 26 |
| 2-hydroxy-3:5-ditert.-butylbenzyl-pyridinium chloride | 28 |

Example 8

Portions of certain of the rubber compounds prepared as in Example 7 are cured in the form of sheets in a press for varying times at 141° C. The stress strain properties are determined according to BS 903, part A2 (1956).

| Property | Cure— Cure time, minutes at 141° C. | Additive | | | |
|---|---|---|---|---|---|
| | | None | N-nitroso-diphenyl-amine | 2(α-methyl-cyclohexyl-4-methyl)-phenylmethyl-pyridinium chloride | 2-hydroxy-5-methyl-3(α-methylcyclo-hexyl)benzyl-pyridinium 2-hydroxy-5-methyl-3(α-methylcyclo-hexyl)phenyl-methane sulphonate |
| Tensile Strength (kg./cm.²) | 15 | 280 | 239 | 249 | 256 |
| | 20 | 285 | 263 | 263 | 276 |
| | 25 | 279 | 288 | 278 | 280 |
| | 30 | 275 | 282 | 273 | 276 |
| Modulus at 300% (kg./cm.²) | 15 | 143 | 102 | 105 | 120 |
| | 20 | 153 | 123 | 126 | 140 |
| | 25 | 170 | 143 | 152 | 156 |
| | 30 | 183 | 153 | 158 | 159 |
| Elongation at Break (Percent) | 15 | 545 | 590 | 590 | 555 |
| | 20 | 500 | 555 | 550 | 560 |
| | 25 | 475 | 545 | 520 | 495 |
| | 30 | 475 | 525 | 495 | 485 |

What we claim is:

1. A compound of the formula

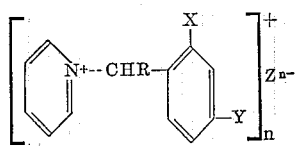

wherein R represents a member of the group consisting of hydrogen and lower alkyl group, one of the groups X and Y is hydroxyl and the other is selected from the group consisting of hydrogen, alkyl, unsubstituted or lower alkyl substituted cycloalkyl groups selected from the class consisting of cyclopentyl and cyclohexyl, benzyl, phenyl, vinyl and allyl, and Z is an anion selected from the group consisting of halide, nitrate, sulphate, phosphate, alkylsulphate, alkanesulphonate, substituted alkanesulphonate, arylsulphonate, aralkylsulphonate, sulphamate, arylcarboxylate, alkylcarboxylate, oxalate, formate, thiocarbamate, thiosulphate and polythionate,
and in which other valences on the benzene and pyridine rings are satisfied by substituents selected from the group consisting of hydrogen, alkyl, unsubstituted or lower alkyl substituted cycloalkyl groups selected from the class consisting of cyclopentyl and cyclohexyl, benzyl, vinyl and allyl,
and $n$ is the valence number of the anion Z.

2. A compound as claimed in claim 1 wherein R stands for a hydrogen atom.

3. A compound as claimed in claim 1 wherein X or Y stands for a hydrogen atom.

4. A compound as claimed in claim 1 wherein the benzene ring carries two substituents selected from the group consisting of alkyl, unsubstituted or lower alkyl substituted cyclopentyl and cyclohexyl, benzyl, phenyl, vinyl and alkyl at least one of which is situated in either the ortho or para positions relative to the hydroxyl group.

5. A compound as claimed in claim 1 wherein the benzene ring carries a substituent in a position ortho or para to the hydroxyl group which is a group of the formula:

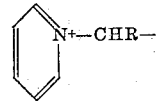

wherein R is selected from the group consisting of hydrogen atoms and lower alkyl groups.

6. A compound as claimed in claim 1 wherein the anion is a halide.

7. The compound as claimed in claim 1 wherein the cation is 2 - hydroxy-5-methyl-3-($\alpha$-methylcyclohexyl) benzylpyridinium.

8. The compound as claimed in claim 1 wherein the cation is 4 - hydroxy-3-methyl-5-tert.-butylbenzylpyridinium.

References Cited

UNITED STATES PATENTS

| | | | |
|---|---|---|---|
| 2,592,273 | 11/1948 | Goebel et al. | 260—2 |
| 2,623,902 | 3/1950 | Crossley | 260—567.6 |
| 2,971,002 | 2/1961 | Feely | 260—294.8 |
| 2,977,368 | 3/1961 | Druey | 260—294.8 |
| 3,158,587 | 11/1964 | Stewart | 260—45.8 |
| 3,174,948 | 3/1965 | Wall et al. | 260—45.8 |

OTHER REFERENCES

Wegler et al.; Die Makromolekulaire Chemie Verlag, Band IX, Heft I (1952), pp. 16, 20.

WALTER A. MODANCE, *Primary Examiner.*

JOHN D. RANDOLPH, *Examiner.*

A. L. ROTMAN, *Assistant Examiner.*